United States Patent [19]
Hinks et al.

[11] Patent Number: 4,625,101
[45] Date of Patent: Nov. 25, 1986

[54] BAR CODE CONFIGURATION AND METHOD OF MOLDING

[75] Inventors: William L. Hinks, Akron, Ohio; John R. Kinstler, Mason, Mich.

[73] Assignee: The Goodyear Tire & Rubber Company, Akron, Ohio

[21] Appl. No.: 583,780

[22] Filed: Feb. 27, 1984

[51] Int. Cl.⁴ ............................................. G06K 7/10
[52] U.S. Cl. ..................................... 235/462; 235/454; 235/490; 425/47
[58] Field of Search ............... 235/462, 490, 494, 454, 235/455; 350/109; 365/106; 425/55, 46, 47

[56] References Cited

U.S. PATENT DOCUMENTS

| Re. 19,496 | 3/1935 | Lawson | 425/47 |
| 2,679,277 | 5/1954 | Gray |  |
| 2,761,489 | 9/1956 | Kraft |  |
| 3,497,576 | 2/1970 | Dvorin | 235/462 X |
| 3,761,725 | 9/1973 | Meyer | 235/494 X |
| 3,781,798 | 12/1973 | Hinks |  |
| 3,892,949 | 7/1975 | Dodson, III |  |
| 4,010,354 | 3/1977 | Apicella, Jr. et al. |  |
| 4,114,033 | 9/1978 | Okamoto et al. | 235/494 |
| 4,210,802 | 7/1980 | Sakai | 235/483 |
| 4,230,266 | 10/1980 | Juvinall | 235/490 |
| 4,292,511 | 9/1981 | Heyman et al. | 235/454 |
| 4,329,573 | 5/1982 | Greene | 235/454 |
| 4,449,042 | 5/1984 | Hampson et al. | 235/494 X |

FOREIGN PATENT DOCUMENTS 3141461  6/1982  Fed. Rep. of Germany.

Primary Examiner—David L. Trafton
Attorney, Agent, or Firm—Frederick K. Lacher; T. P. Lewandowski

[57] ABSTRACT

A bar code configuration which may be molded in the sidewall of a tire and has even surface portions and uneven surface portions for selectively reflecting light from a light source toward a receiving sensor to define bars of a bar code. The uneven surface portions may have grooves or ribs with a sawtooth cross section and sloped faces for reflecting light to a receiving sensor at an angle to the sidewall surface. The bar code configuration for tires molded in a particular mold may be provided by an insert fastened to the mold and having even surfaces and uneven surfaces at the inner mold face to mold the even surface portions and uneven surface portions of the bar code configuration in the tire sidewall as the tire is being vulcanized. By changing the insert the bar code configuration can be changed to provide different information about the tire.

23 Claims, 11 Drawing Figures

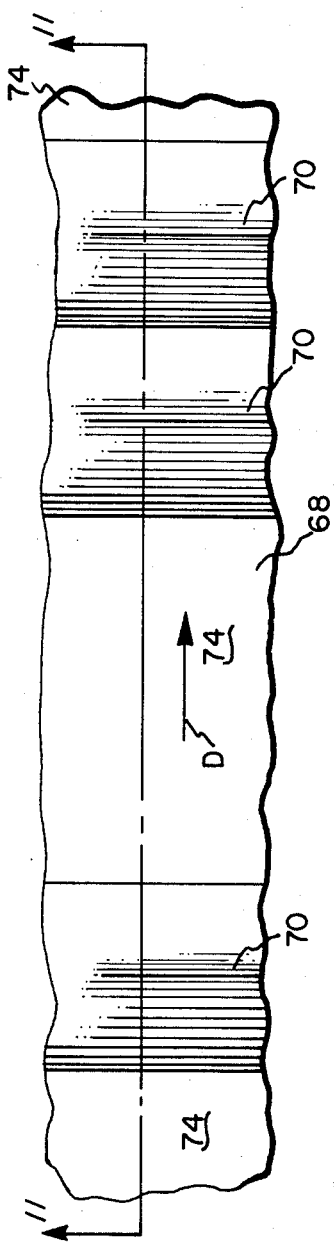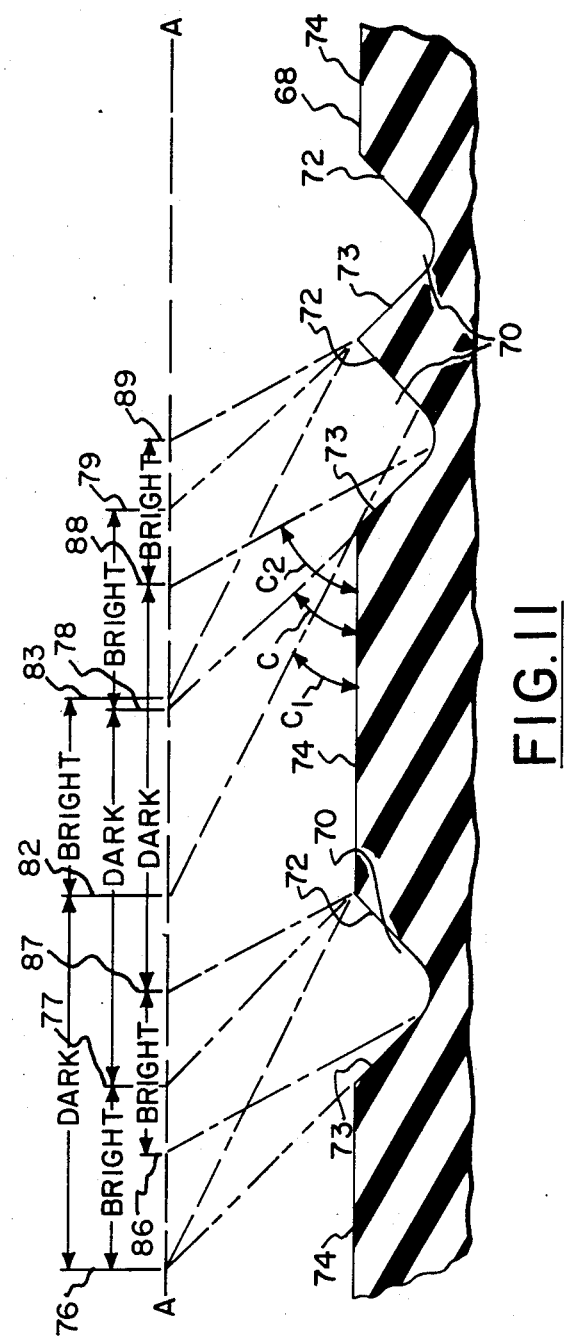

BAR CODE CONFIGURATION AND METHOD OF MOLDING

This invention relates generally, as indicated, to a bar code for providing information about an article it is associated with and to a method for molding the bar code configuration in the surface of the article. This is especially important in the manufacture of tires to automatically identify the tire size, tire type, manufacturing plant, and date of manufacture by passing a tire by a scanner.

Heretofore magnetically encoded tags have been attached to tire surfaces for reading of information by a magnetic encoder. Apparatus for mechanically reading raised identification symbols molded on the tire surface has also been proposed.

Bar codes and scanners have been used for providing information concerning many products and it is desired that they be utilized also for tires. Printed lables with bar codes have been adhered to the surface of an uncured tire; however, during vulcanization of the tire in tire molds and the handling of the tire thereafter the labels have been distorted by the uneven surface of the tire. Problems have also been encountered with printed labels on molded tires which have been wet when the bar code was read causing variations in the reflectivity of the surface. Where ribs and grooves have been molded in the surface of a tire there have been problems distinguishing the ribs or grooves optically from the background. The scanners used heretofore have been large and of a special design costing more than the standard off-the-shelf scanners. Some of the bar codes have also required a substantial area of the sidewall which is not desirable because of the amount of information which must be molded on the surface of the sidewall.

The present invention may use standard off-the shelf scanners and provides a compact bar code configuration which may be molded in the sidewall of a tire. The bar code configuration has even surface portions and uneven surface portions for selectively reflecting light from a light source in the scanner toward a receiving sensor in the scanner to define bars of a bar code. The uneven surface portions may have sloped faces so that the scanner can be located at a position spaced from a position directly over the reflecting sloped faces to provide flexibility of installation and operation. The bar code configuration for tires molded in a particular mold may be provided by an insert fastened to the mold and having even surfaces and uneven surfaces at the inner mold face to mold the even surface portions and uneven surface portions of the bar code configuration in the tire sidewall as the tire is being vulcanized. By changing the insert the bar code configuration can be changed to provide different information such as the date and specifications of the tire.

In accordance with one aspect of the invention there is provided a system having a light source and a receiving sensor for scanning a bar code to provide information about an article from a bar code configuration on the surface of the article comprising even surface portions and uneven surface portions for selectively reflecting light from the light source to the receiving sensor, the even surface portions reflecting substantially all light received from the light source in a first direction and the uneven surface portions reflecting light from the light source in at least another direction different from the first direction whereby the light reflected to the receiving sensor defines bars of the bar code.

In accordance with another aspect of the invention there is provided a method of molding a bar code configuration in the surface of an article cured in a mold cavity having an inner mold face comprising fastening an insert to a mold with the insert having even surfaces and uneven surfaces at the inner mold face, placing the article in the mold with the surface of the article in contact with the insert to mold even surface portions with the even surfaces of the insert and uneven surface portions with the uneven surfaces of the insert and removing the article from the mold.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In the annexed drawings:

FIG. 10 is a fragmentary plan view of a sidewall of a tire showing a further modification of the bar code configuration embodying the invention.

FIG. 11 is a fragmentary sectional view taken along the line 11—11 in FIG. 10.

Figure 1:
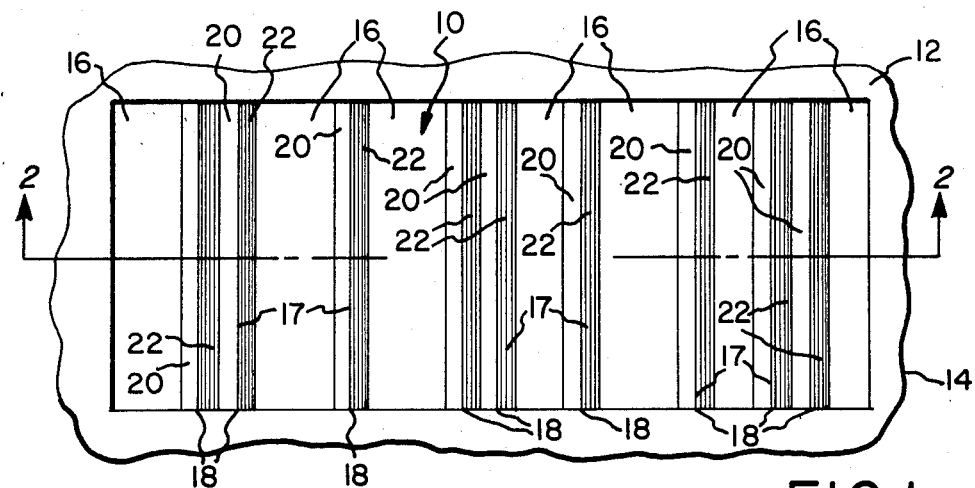
FIG. 1 is a fragmentary plan view of a sidewall of a tire showing the molded bar code configuration embodying the invention.
Figure 2:
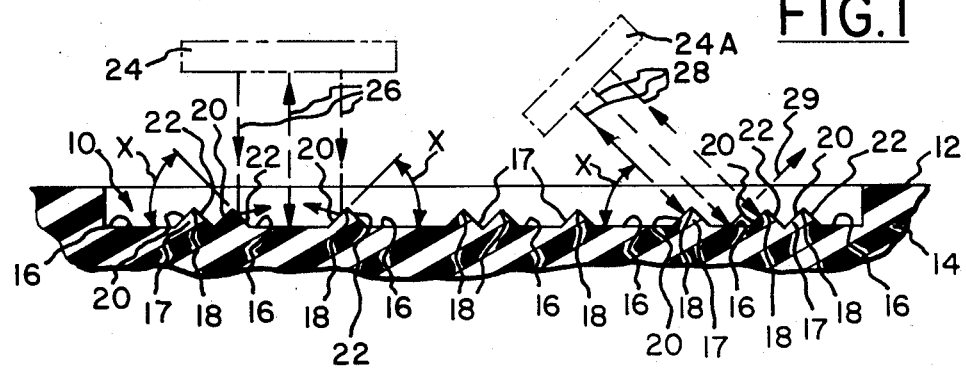
FIG. 2 is a fragmentary sectional view taken along the line 2—2 in FIG. 1.

Referring to FIGS. 1 and 2, a bar code configuration 10 embodying the invention is shown molded in a surface such as sidewall 12 of an article such as tire 14. The bar code configuration 10 includes even surface portions such as flats 16 separated by uneven surface portions such as rib portions 17. The bar code configuration 10 has generally parallel adjacent flats 16 and rib portions 17. Ribs 18 of rib portions 17 may have sawtooth cross sections and sloped faces 20 and 22 at an angle X to the plane of the flats 16 as shown in FIG. 2. The angle X may be from about 35 degrees to 55 degrees and in this embodiment is about 45 degrees. The ribs 18 also extend in a direction generally parallel to the direction of the flats 16 and rib portions 17.

In the system described for scanning a bar code to provide information about the tire 14 on which the bar code configuration 10 is molded, a scanner 24, shown schematically in dashed lines, including a light source and the receiving sensor may be positioned over the bar code configuration as shown at the left side of FIG. 2. Light from the light source in the scanner 24 is received in a first direction 26 by the flats 16 and reflected in the first direction to the receiving sensor in the scanner. The light received from the light source in the scanner 24 in the first direction 26 by the sloped faces 20 and 22 of the ribs 18 is reflected in other directions different from the first direction to define the bars of the bar code. As shown in FIG. 2, the width of the rib portions 17 and the different spacing of the rib portions is conveyed to the scanner 24 during relative circumferential movement of the scanner relative to the ribs 18 which extend substantially radially of the tire 14.

As shown at the right side of FIG. 2, scanner 24A may be tilted so that the light received from the light source in the scanner is received in a second direction 28 which is at the same angle X to the flats 16 as the sloping faces 20 and 22. The light reflected to the receiving sensor in the scanner 24A is therefore reflected in the second direction 28 from the sloped faces 20 of the ribs 18 to define the bars of the bar code. The light received in the first direction 26 by the flats 16 is reflected in another direction 29 as shown in FIG. 2.

Figure 3:
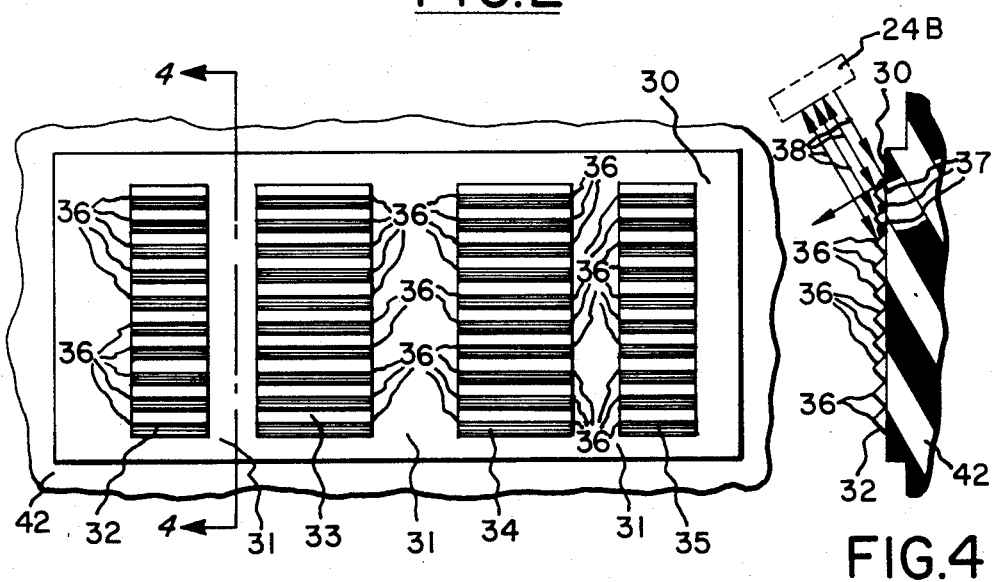
FIG. 3 is a fragmentary plan view of a sidewall of a tire showing a modification of the bar code configuration embodying the invention.
Figure 4:
FIG. 4 is a fragmentary sectional view taken along the line 4—4 in FIG. 3.

Referring to FIGS. 3 and 4, a modified bar code configuration 30 is shown in which the even and uneven surfaces include generally parallel circumferentially spaced flats 31 and rib portions 32, 33, 34 and 35 of ribs 36. A scanner 24B, shown schematically in dashed lines, including a light source and a receiving sensor may be spaced radially from the ribs 36 which extend in a direction generally perpendicular to the rib portions 32, 33, 34 and 35, and flats 31 between them. Each of the ribs 36 has a sawtooth cross section providing sloping faces 37 extending in a generally circumferential direction for reflecting light in a radial direction 38 to the receiving sensor in the scanner 24B. The rib portions 32, 33, 34 and 35 of ribs 36 may be of different widths and may be separated by flats 31 of different widths to define the bars of the bar code of a tire 42.

Figure 5:
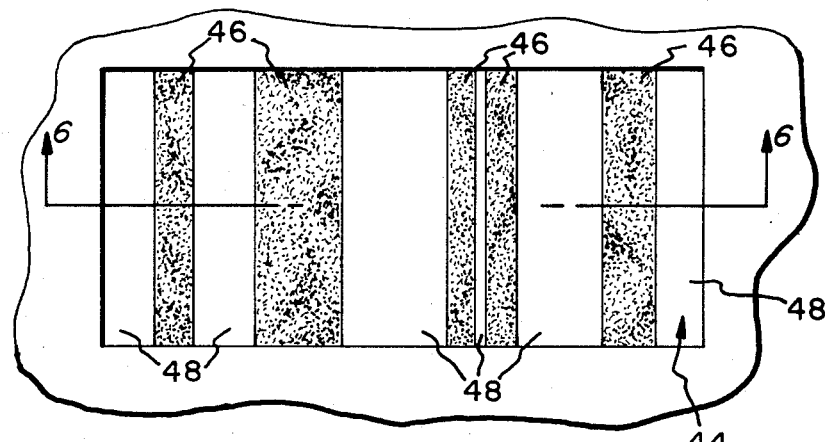
FIG. 5 is a fragmentary plan view of a sidewall of a tire showing another modification of the bar code configuration embodying the invention.
Figure 6:
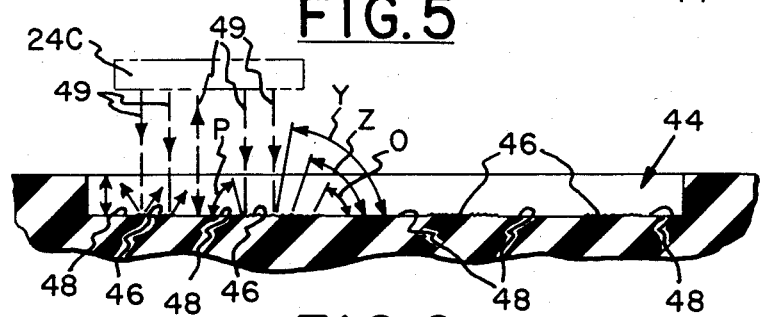
FIG. 6 is a fragmentary sectional view taken along the line 6—6 in FIG. 5.

Referring to FIGS. 5 and 6, another modified bar code configuration 44 is shown in which uneven surface portions include a rough surface 46 having a plurality of reflecting faces positioned at a plurality of angles Y, Z, O and P relative to the plane of even surface portions such as flats 48 so that most of the light reflected by the rough surface is in directions away from the receiving sensor in scanner 24C, as shown in FIG. 6. Light from the light source in the scanner 24C is received in a first direction 49 and reflected from the flats 48 to the receiving sensor for defining the bars of the bar code.

Figure 7:
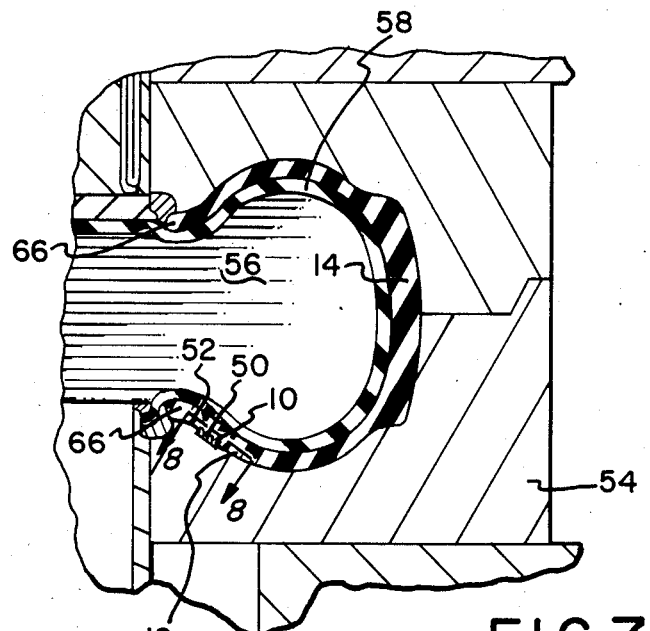
FIG. 7 is a fragmentary sectional view of a tire press in the closed condition and containing a tire and curing bladder within the mold sections for curing the tire. The insert for molding the bar code configuration in the tire sidewall is shown fastened to the inner mold face of one of the mold sections.

In order to mold the bar code configuration 10 in the sidewall 12 of the tire 14, an insert 50 is fastened to an inner mold face 52 of a mold 54 which may be a two-piece mold as shown in FIG. 7. The mold 54 has a mold cavity 56 in which the uncured tire 14 is placed and the mold closed. A curing bladder 58 may be expanded into contact with the inner surface of the tire 14 during the curing process.

Figure 8:
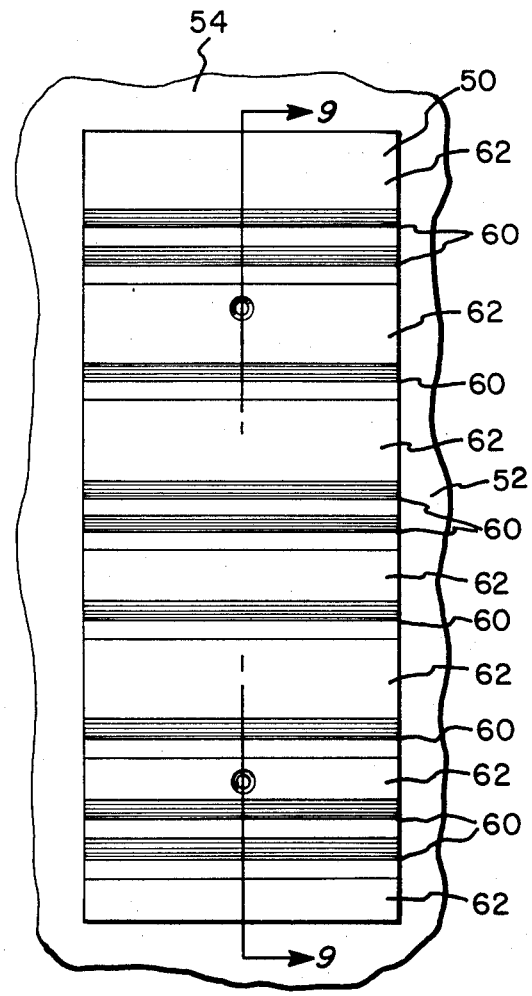
FIG. 8 is an enlarged fragmentary sectional view of the insert on the inner mold face with the tire removed, taken along line 8—8 in FIG. 7.
Figure 9:
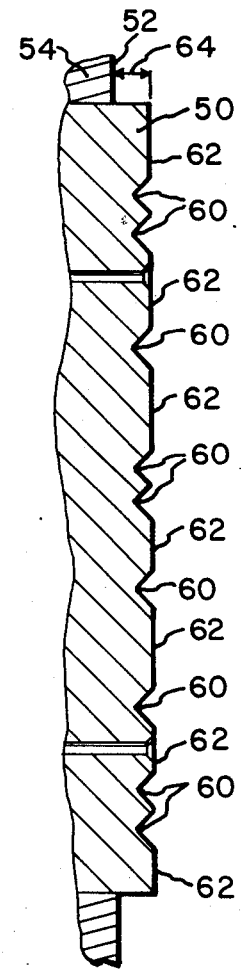
FIG. 9 is a fragmentary sectional view of the insert on the inner mold face taken along the line 9—9 in FIG. 8.

Referring to FIGS. 8 and 9, the insert 50 has uneven surfaces such as grooves 60 extending in a generally radial direction for molding ribs 18 shown in FIGS. 1 and 2. The insert 50 has even surfaces such as flats 62 for molding the flats 16 of the bar code configuration 10 shown in FIGS. 1 and 2. The flats 62 and grooves 60 of the insert 50 extend in a generally radial direction for molding the ribs 18 into a bar code configuration 10 which is readable by a receiving sensor of the scanner 24 movable circumferentially relative to the tire 14.

The insert 50 may be offset radially inward of the inner mold face 52 a distance 64, shown in FIG. 9, to provide the recessed bar code configuration 10 shown in FIGS. 1 and 2. Where it is desired to have a raised bar code configuration 30 as shown in FIGS. 3 and 4, the insert 50 may be offset radially outward of the inner mold face 52.

After the tire 14 is placed in the mold cavity 56 and the curing bladder 58 expanded, the tire is vulcanized by subjecting it to heat and pressure for a predetermined period of time. During this time the insert 50 molds the bar code configuration 10 in the sidewall 12, preferably at a position adjacent a bead portion 66 of the tire 14. The tire 14 may be of a reinforced resilient rubberlike material and the bar code configuration 10 is molded in this material with the ribs 18 in an integral configuration with the flats 16.

As shown in FIGS. 1 and 2, the flats 16 are at substantially the same depth and have a greater depth than the ribs 18. The ribs 18 have a height less than the depth of the flats 16 to protect them from damage during the handling of the tire 14. In a similar manner, the rough surfaces 46 and flats 48 of the bar code configuration 44, shown in FIGS. 5 and 6, are recessed to protect the bar code configuration from damage during handling.

After the bar code configuration 10 has been molded in the sidewall 12, the tire 14 may be removed from the mold 54. When it is desired to mark the tire 14 with other information, the insert 50 may be removed as by removing screws and be replaced with another insert for molding another bar code configuration 10 providing other information. In the embodiment shown, the insert 50 is of metal such as aluminum; however, inserts of other material may be used and these may have grooves 60 and flats 62 provided by stamping or other suitable shaping means to mold the bar code configuration 10.

Referring to FIGS. 10 and 11, a preferred bar code configuration 68 is shown having uneven surface portions such as grooved portions including a plurality of generally parallel V-shaped grooves 70. The grooves 70 have parallel sloped faces 72 on one side for reflecting light to a receiving sensor. Sloped faces 73 on the other side of the grooves 70 may also reflect light with the receiving sensor in a different position. The bar code configuration 68 includes even surface portions such as flats 74 betwen the grooves 70 which are positioned in generally parallel adjacent flats and grooved portions with the grooves extending in a direction generally parallel to the flats and grooved portions.

In FIG. 11 line A—A represents the path of a receiving sensor moving over the bar code configuration 68 in a direction D—D, shown in FIG. 10, generally perpendicular to the direction of the grooves 70. The scanner (not shown) containing the receiving sensor may be tilted so that the light received from the light source and reflected to the receiving sensor is at an angle C to the flats 74 which may be in substantially the same plane as the sidewall of the tire. Preferably the angle C is the same as the angle of the sloped faces 72 of the grooves 70 which in this embodiment is 45 degrees. The light reflecting from the sloped faces 72 with the angle C being the same as the angle of the sloped faces is shown by dash-dot-dot-dash lines in FIG. 11. The length of the bright bands and dark bands is indicated between vertical lines 76, 77, 78 and 79 in FIG. 11.

With the bar code configuration 68 the angle of the light source may vary somewhat from the angle C and the capability of the light sensor to distinguish between the narrow and wide bands is substantially maintained. This is important in operations where the angle of the light source is varied because of the placement of the scanner or the type of scanner which is used. In addition to the described installation where there is relative movement of the receiving sensor in a direction D—D as shown in FIG. 10, a scanner may be used which has a sweeping beam resulting in different angles of the light source for different flats 74 and grooves 72 along the bar code configuration.

As shown in FIG. 11, when angle C1 is less than angle C of 45 degrees the reflected light indicated by dash-dash-dot-dash-dash lines will produce bright and dark bands from the sloped faces 72 and surfaces of the flats 74 which have substantially the same widths as the bright and dark bands produced when the angle C is 45 degrees. These widths are indicated between the vertical lines 76, 82 and 83 in FIG. 11.

When angle C2 is greater than angle C of 45 degrees the reflected light, indicated by the dash-dot-dash lines in FIG. 11 will produce bright and dark bands from the sloped faces 72 and the surfaces of the flats 74. The widths of these bnads are indicated between the vertical lines 86, 87, 88 and 89 in FIG. 11. As the angle of the light source C2 increases over angle C of 45 degrees the dark bands may increase in width and the bright bands may decrease in width which limits the capability of the light sensor to distinguish between the narrow and wide bands at an angle C2 greater than angle C depending on the amount the widths of the bands are changed.

The amount the angles C1 or C2 may vary from the angle C without losing the capability of the light sensor to distinguish between the narrow and wide bands is dependent on the amount of reflected intensity which is reduced as the angle deviation from the angle C is increased. The reflected intensity is also a function of the reflectivity of the sloped surfaces 72 and the brightness of the light source. Accordingly in operation with the bar code configuration 68 of this embodiment the angle C may vary from the angle of the sloped faces 72 and 73 within the limits discussed above for angles C1 and C2 without destroying the capability of the light sensor to distinguish between the narrow and wide bands.

While certain representative embodiments and details have been shown for the purpose of illustrating the invention, it will be apparent to those skilled in this art that various changes and modifications may be made therein without departing from the spirit or scope of the invention.

What is claimed is:

1. In a system having a light source and a receiving sensor for scanning a bar code configuration on the surface of said article comprising even surface portions and uneven surface portions for selectively reflecting light from said light source to said receiving sensor, said even surface portions reflecting substantially all light received from said light source in a first direction and said uneven surface portions including a sloped face positioned for reflecting light from said light source in a second direction different from said first direction and said light source and said receiving sensor being located generally in the same direction from said bar code configuration whereby said light reflected to said receiving sensor defines bars of said bar code.

2. A bar code configuration in accordance with claim 1 wherein said uneven surface portions include at least one rib with a sawtooth cross section having said sloped face positioned to reflect light to said receiving sensor in said second direction.

3. A bar code configuration in accordance with claim 2 including a plurality of ribs with parallel sloped faces positioned to reflect light to said receiving sensor in said second direction.

4. A bar code configuration in accordance with claim 3 wherein said even surface portions and said uneven surface portions are positioned in generally parallel adjacent flats and rib portions.

5. A bar code configuration in accordance with claim 4 wherein said ribs extend in a direction generally parallel to said flats and rib portions.

6. A bar code configuration in accordance with claim 4 wherein said ribs extend in a direction generally perpendicular to said flats and said rib portions.

7. A bar code configuration in accordance with claim 1 wherein said even and uneven surfaces are of the same material.

8. A bar code configuration in accordance with claim 6 wherein said material is a resilient rubberlike material.

9. A bar code configuration in accordance with claim 1 wherein said bar code configuration is recessed in the surface of said article, and said even surface portions are at substantially the same depth.

10. A bar code configuration in accordance with claim 9 wherein said uneven surface portions are at a lesser depth than said even surface portions.

11. A bar code configuration in accordance with claim 10 wherein said uneven surface portions include at least one rib with a sawtooth cross section positioned above said even surface portions.

12. A bar code configuration in accordance with claim 1 wherein said uneven surfaces are molded in said material in an integral configuration with said even surfaces.

13. A bar code configuration in accordance with claim 1 wherein said uneven surface portions include at least one V-shaped groove having said sloped face positioned to reflect light to said receiving sensor in said second direction.

14. A bar code configuration in accordance with claim 13 including a plurality of grooves with parallel sloping faces positioned to reflect light to said receiving sensor in said second direction.

15. A bar code configuration in accordance with claim 14 wherein said even surfaces and said uneven surface portions are positioned in generally parallel adjacent flats and grooved portions.

16. A bar code configuration in accordance with claim 15 wherein said grooves extend in a direction generally parallel to said flats and grooved portions.

17. A method of molding a bar code configuration in the sidewall surface of a pneumatic tire cured in a tire mold cavity having an inner mold face comprising fastening an insert to said tire mold with said insert having even surfaces and uneven surfaces at said inner mold face, placing said tire in said tire mold with said sidewall surface of said tire in contact with said insert, applying heat to cure said tire in said tire mold and to mold even surface portions with said even surfaces of said insert and uneven surface portions having sloped faces with said uneven surfaces of said insert and removing said tire from said tire mold.

18. The method of claim 17 wherein after placing said article in said mold heat is applied to cure said article in said mold.

19. The method of claim 17 wherein said even surfaces and uneven surfaces of said insert are offset inwardly of said inner mold face to mold a recessed bar code configuration in said sidewall.

20. The method of claim 17 wherein said even surfaces and said uneven surfaces are recessed in said inner mold surface to mold a raised bar code configuration on said sidewall.

21. The method of claim 17 wherein said even surfaces and uneven surfaces are positioned on said insert in generally parallel adjacent flats and grooved portions and said insert is fastened to said tire mold with said flats and grooved portions extending in a generally radial direction for molding ribs into a bar code configuration which is readable by a receiving sensor spaced from said ribs.

22. The method of claim 21 wherein grooves of said grooved portions extend in a generally radial direction for molding ribs into said bar code configuration which is readable by a receiving sensor spaced a circumferential direction from said ribs relative to said tire.

23. The method of claim 21 wherein grooves of said grooved portions extend in a generally circumferential direction for molding ribs into said bar code configuration which is readable by a receiving sensor spaced in a radial direction from said ribs relative to said tire.

* * * * *